May 30, 1950 J. H. BOOTH 2,509,803
WHEEL SUSPENSION
Filed July 28, 1945 2 Sheets-Sheet 1
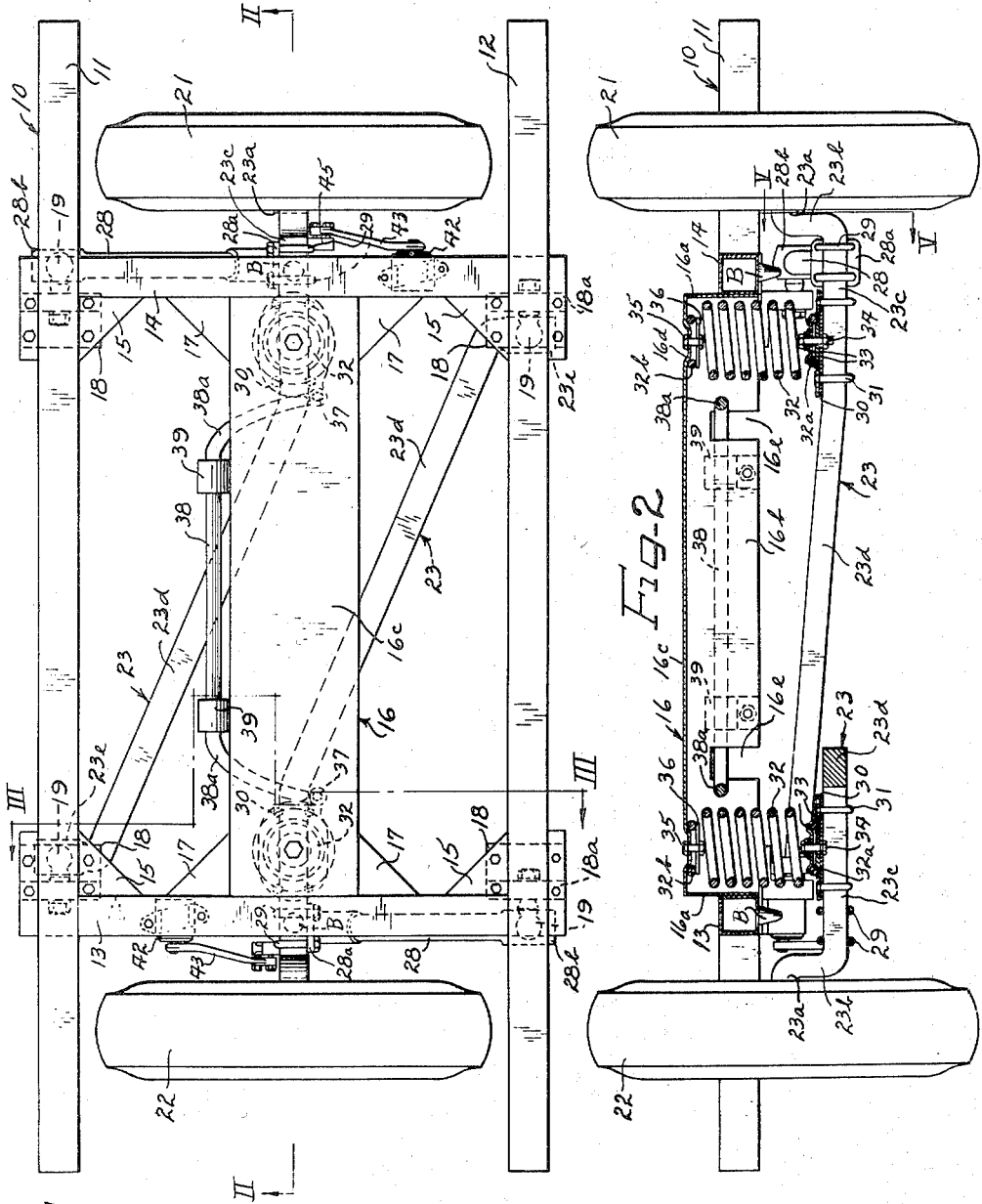
Inventor
James H. Booth May 30, 1950  J. H. BOOTH  2,509,803
WHEEL SUSPENSION
Filed July 28, 1945  2 Sheets-Sheet 2
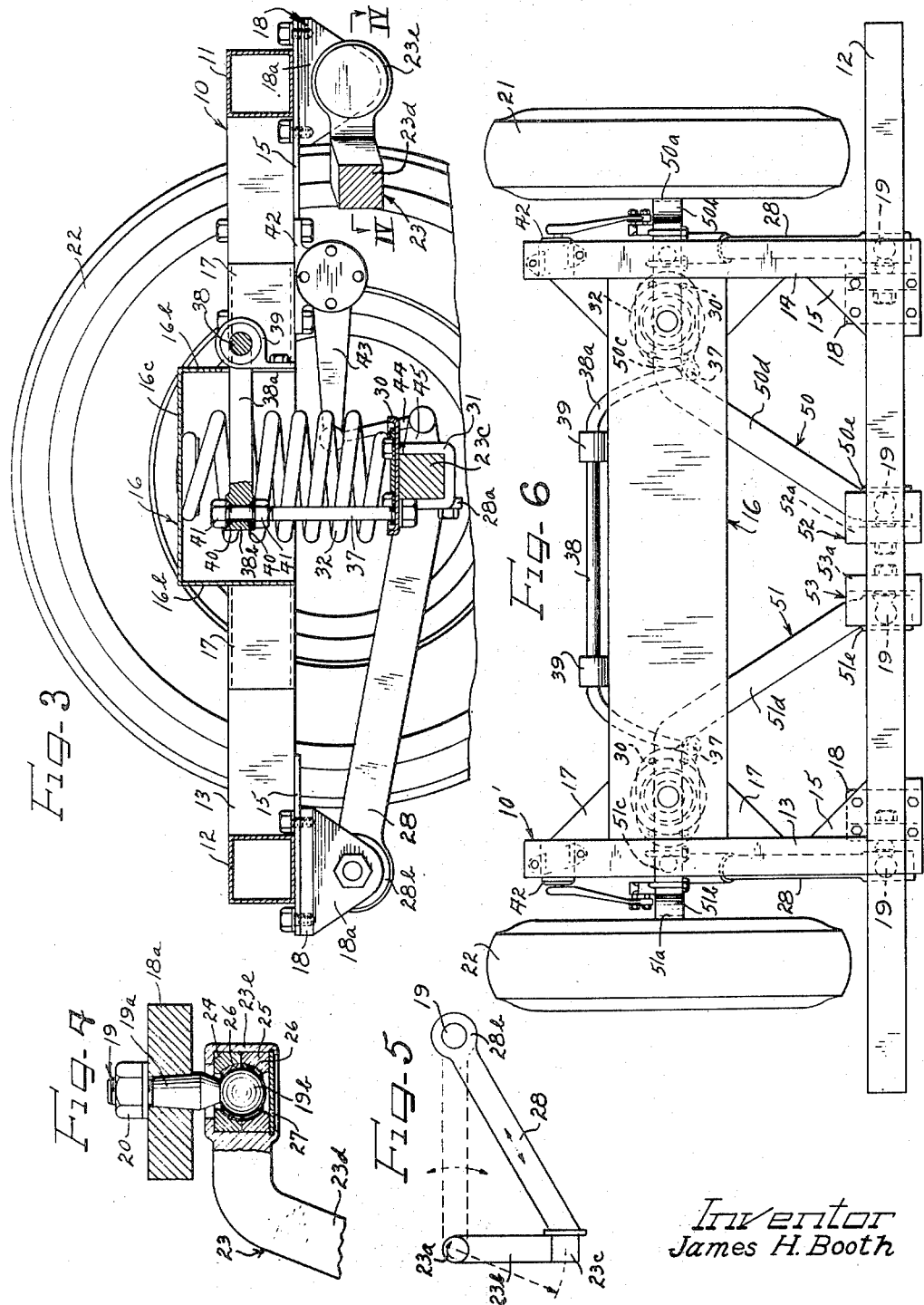
Inventor
James H. Booth Patented May 30, 1950

2,509,803

UNITED STATES PATENT OFFICE 2,509,803

WHEEL SUSPENSION

James H. Booth, Detroit, Mich., assignor to Thompson Products, Inc., Cleveland, Ohio, a corporation of Ohio Application July 28, 1945, Serial No. 607,608

8 Claims. (Cl. 280—124)

This invention relates to independent wheel suspensions for vehicles wherein each wheel is equipped with an independent suspension arm or axle extending inwardly and longitudinally of the wheel, and wherein each suspension arm or axle is equipped with a longitudinally extending strut adjacent the wheel. The suspension arm or axle and its strut are swingably suspended on transversely aligned spaced pivots so that the wheels will rise and fall in vertical planes to maintain the same tread width between the wheels.

More specifically, the invention deals with independently sprung wheel suspensions wherein each wheel swings parallel to the longitudinal axis of the vehicle on universal joints such as ball joints which are mounted on a transverse axis.

A feature of this invention resides in the provision of suspension devices in the assembly which eliminate the transfer of torsional strains to the vehicle frame and body and accommodate misalignment of parts encountered in manufacturing to increase the tolerance limits for the parts. These suspension devices are preferably universal joints, such as ball joints.

Another feature of the invention resides in the use of dropped-center axles or control arms for the wheel suspension to reduce bending moments on braking of the wheels, and to provide longitudinally extending struts which will in the main, only be placed under compression or tension loads when the wheels are braked.

A further feature of this invention resides in the provision of a wheel suspension wherein the wheel is swung from widely spaced pivots that are aligned transversely of the vehicle.

The invention will hereinafter be specifically described as embodied in wheel suspensions for trailers, but it should be understood that the wheel suspensions of this invention are suitable for use with dirigible wheels such as the front wheels of an automotive vehicle, or with driving wheels that might also be steerable. In the illustrated embodiments of the invention, the main suspension arms act as axles for the wheels, but in dirigible wheel suspensions according to this invention it should be understood that these axles can carry steerable sub-axles. In driven wheel suspensions according to this invention the main suspension arms or axles can carry driving axles. The term "axle" as used herein will include all such assemblies, and is not limited to the illustrated axle.

It is, then, an object of this invention to provide wheel suspensions for vehicles and the like wherein the wheels are independently suspended on universal joint pivots.

A still further object of the invention is to provide an independent wheel suspension for vehicles and the like wherein each wheel is pivotally suspended on a pair of transversely aligned ball joints.

Another object of the invention is to provide a vehicle wheel suspension which maintains the same tread width between the wheels irrespective of the relative rise and fall of the wheels, and which will not transmit torsional strains to the vehicle frame or body.

A still further object of the invention is to provide a wheel suspension with a main suspension arm or axle extending diagonally across the vehicle frame and having a longitudinally extending reinforcing strut adjacent the wheel to provide widely spaced suspension points for the wheel.

A still further object of the invention is to provide an independently sprung wheel assembly wherein independent springs for each wheel are located closely adjacent the wheels to minimize side sway.

Another object of the invention is to provide an inexpensive, efficient and simple independent wheel assembly for vehicles which will not subject the vehicle to torsional strains.

Other and further objects of the invention will be apparent to those skilled in the art from the following detailed description of the annexed sheets of drawings which, by way of preferred examples, illustrate two embodiments of the invention.

On the drawings:

Figure 1 is a top plan view of one form of wheel suspension according to this invention especially suitable for attachment to a trailer body.

Figure 2 is a transverse vertical cross-sectional view, with parts in front elevation, taken along the line II—II of Figure 1.

Figure 3 is a fragmentary longitudinal vertical cross-sectional view, with parts in side elevation, taken along the line III—III of Figure 1.

Figure 4 is an enlarged fragmentary horizontal cross-sectional view taken along the line IV—IV of Figure 3.

Figure 5 is a somewhat diagrammatic vertical partial elevational view illustrating the reinforcing strut and drop axle arrangement for minimizing bending moments on braking of the wheel, said view being taken along the line V—V of Figure 2.

Figure 6 is a top plan view similar to Figure 1 but illustrating a modified wheel suspension according to this invention.

As shown on the drawings:

In Figures 1 to 3 inclusive there is illustrated an independent wheel suspension according to this invention especially adapted for direct attachment to a trailer body such as a house trailer. This suspension includes a frame 10 that can be directly bolted onto the bottom of the vehicle. The frame 10 has spaced transverse box beams 11 and 12 held in spaced opposed parallel relation by box beams 13 and 14 which extend between the transverse beams and are connected thereto as by welding at points inwardly from the outer ends of the transverse beams. The longitudinal and transverse beams are reinforced at their points of connection by gusset plates 15.

A channel beam 16 extends across the space between the longitudinal beams 13 and 14 midway between the transverse beams 11 and 12 and has end faces 16a welded to the inner faces of the box beams 13 and 14 as shown in Figure 2. Gussets 17 shown in Figures 1 and 3 are welded to the side flanges 16b of the channel beam and to the inner faces of the box beams 13 and 14 for reinforcing the connections between the channel beam and the longitudinal beams. The channel beam has a top wall or web 16c spanning the side flanges 16b thereof.

Each gusset plate 15 has a bracket plate 18 bolted on the under face thereof. The bracket plates 18 have depending vertical flanges or ears 18a apertured to receive therethrough the shanks of ball studs 19. As shown in Figure 4, each ball stud 19 has a tapered shank 19a fixedly held in a tapered aperture of the flange or ear 18a by a nut 20 threaded on the end of a shank which projects beyond the ear or flange 18a.

Each ball stud 19 has a ball end 19b. As shown in Figure 1 the ball ends of the ball studs 19 are under the transverse beams 11 and 12 with the ball ends under the beam 11 facing to the right, and with the ball end of the studs under the beam 12 facing to the left. As will be hereinafter described, the ball ends of the studs provide universal pivot supports for wheels 21 and 22 with the ball ends under the beam 11 pivotally supporting the wheel 21 and the ball ends under the beam 12 pivotally supporting the wheel 22.

The wheel 21 has an axle 23. This axle 23 has a transverse outwardly extending end portion 23a projecting beyond the longitudinal beam 14 midway between the ends of the transverse beams 11 and 12. The wheel 21 is rotatably mounted around this portion 23a. The axle is bent downwardly from the portion 23a to provide a vertical leg 25b adjacent the wheel. The axle then extends at right angles from the lower end of the portion 23b to provide a transversely inward extending portion 23c. The portion 23c extends inwardly to an upwardly and rearwardly extending diagonal portion 23d which spans the space between the longitudinal beams 13 and 14 and has a rearwardly projecting eye end 23e forming a socket for the ball stud 19 that faces the wheel 21 and is located on the side of the frame remote from the wheel 21. As shown in Figure 4, this socket end 23e receives a pair of rubber or other resilient material rings 24 and 25. These rings are lined with semi-spherical plastic material bearing cups 26 to define a ball socket for the ball end 19b of the stud. The socket portion 23e of the axle 23 has an inturned apertured flange at one end thereof forming a shoulder for the bearing ring 24 and freely accommodating the shank 19a of the stud in the aperture thereof to permit free tilting movements of the axle relative to the stud. The other end of the socket 23e is closed by a closure plate 27 that is peened or spun into the socket.

If desired the plastic material liners 26 for the bearing rings 24 and 25 can be composed of a plurality of separated plastic perimetric sections with grooves therebetween to provide a wear take-up arrangement, or these cups 26 can be grooved along their inner faces so as to be somewhat radially deformable. The rubber rings 24 and 25 are maintained under preloaded conditions so that they will tend to contract the bearing cups into good bearing fit around the ball end of the stud.

The wheel 22 has an identical axle 23 but the diagonal portion 23d thereof extends longitudinally forward from the axis of the wheel while the socket end 23e thereof extends forwardly instead of rearwardly to receive the ball end of the ball stud 19 facing the wheel 22 and located under the beam 12 adjacent the wheel 21.

In this arrangement it is only necessary to produce one form of axle 23 to accommodate both wheels 21 and 22 and the diagonal portions 23d of the axles extend in parallel relation under the frame 10 between the longitudinal beams 13 and 14 of the frame. Each axle is connected to the frame 10 on the side of the frame remote from the wheel carried by the axle.

A strut 28 is provided for each axle 23. These struts 28 have mounting pads 28a at one end thereof connected to the transversely inwardly extending portions 23c of the axles adjacent the vertical portions 23b of the axle by means of U-bolts 29. The strut 28 adjacent the wheel 21 extends rearwardly from the axle portion 23c and has an eye end 28b providing a socket receiving the ball end of the stud 19 facing the wheel 21 under the transverse beam 11. Bearing rings such as 24 and 25 illustrated in Figure 4 are provided in the socket 28b to define a ball seat for the ball end of the stud.

The strut 28 for the axle receiving the wheel 22 extends forwardly from the axle portion 23c under the transverse beam 12 and has its eye end 28b receiving the remaining ball stud 19.

While the struts have been illustrated as being connected to the axles by means of U-bolts or straps, it should be understood that these struts could be integral with the axles, welded to the axles, or otherwise connected therewith.

Each wheel 21 or 22 is thus pivotally suspended by means of ball joints at two widely spaced points lying on the same transverse axis. The wheels are thus free to rise and fall relative to the frame 10 in true spaced parallel vertical planes, and the tread width between the wheels is not changed. The wide spacing of the suspension points stabilizes the suspension against tilting relative to the vertical planes in which the wheels swing.

A spring pad 30 is secured on top of the transverse inwardly extending portion 23c of each axle 23 by means of saddle or U-bolts 31. Each spring pad 30 anchors the bottom end coil of a vertical coil spring 32. As illustrated in Figure 2, the bottom end coil 32a of each coil spring 32 is clamped between retainer plates 33 held on the pads 30 by means of a bolt 34.

The coil springs 32 extend into the channel beam 16 adjacent the end walls 16a thereof and have their top end coils 32b seated around depressions 16d formed on the top wall 16c of the channel beam. A bolt 35 holds a retainer plate 36 to clamp the end coil 32b to the channel beam 16.

The axles 23 are thus spring suspended from the channel beam 16 at points closely adjacent the wheels. This provides a spring suspension which will effectively resist side sway of the vehicle because the springs are widely transversely spaced and are positioned close to the wheels.

As best shown in Figure 3, each spring pad 30 carries an upstanding rod 37 projecting into the channel beam 16 alongside of the inner face of the spring 32. A torsion rod or stabilizer bar 38 is rockably mounted in bearings 39 carried on the rear face of the flange 16b of the channel beam 16. This torsion rod 38 has forwardly extending portions 38a projecting into the channel beam 16 through slots 16e in the rear flange 16b of the beam. These portions 38a have eye ends 38b in the channel beam 16 receiving the top ends of the rods 37. Opposed rubber grommets 40 are seated in each eye end 38b and are abutted by nuts 41 on the rod 37 to provide a joint accommodating relative tilting movements between the torsion rod and each rod 37.

The torsion rod 38 increases the torsional rigidity of the wheel suspension. However, the rod will twist to accommodate independent rise and fall of each wheel. This rod further stabilizes the assembly against side sway or rocking, and makes possible the use of light springs.

Hydraulic shock absorbers have the casings 42 thereof secured to the under faces of the longitudinal beams 13 and 14 on the sides of the axles remote from the struts 28. These shock absorbers have operating arms 43 connected through links 44 with lugs 45 provided on the portions 23c of the axles. The shock absorbers function the same as in other wheel suspensions to stabilize the assembly. The links 44 connecting the operating arms of the shock absorbers with the axles can pivot to accommodate swinging of the axles about their suspension points.

Rubber bumpers B are carried by the bottom faces of the longitudinal beams 13 and 14 above the portions 23c of the axles to snub excessive shocks.

As illustrated in Figure 5, when a wheel is braked, the portion 23a of the axle is twisted as shown by the arrow, thus tending to swing the portion 23c of the axle forwardly. This places the strut 28 under tension. A reverse action would place the strut 28 under compression. The dropped axle portion 23b is thus desirable to minimize bending moments on a reinforcing strut such as are illustrated in dotted lines in Figure 5. Thus if the strut were connected as shown in dotted lines to the axle portion 23a, twisting forces exerted on the axle would tend to bend the strut as indicated by the arrow. These bending moments are reduced by the use of the dropped-center axle and by connecting the strut to the dropped portion of the axle.

In the modification illustrated in Figure 6, both wheel suspensions are carried by ball joints located on a single transverse axis. In this construction it is necessary to use right and left-hand axles whereas in the construction of Figures 1 to 3 the same identical axle can be used with either wheel.

In Figure 6, parts identical with parts described in Figures 1 to 3 have been marked with the same reference numerals. As shown in Figure 6, the frame 10′ does not have the rear frame beam 11, since both axles are suspended from the front frame beam 12.

In Figure 6, a right hand axle 50 is provided for the wheel 21 and includes a transversely outwardly extending portion 50a receiving the wheel 21 therearound, a downwardly extending vertical portion 50b adjacent the portion 50a, a transversely inwardly extending horizontal portion 50c extending under the frame beam 14 and having the strut 28 and spring pad 30 affixed thereto, a forwardly and inwardly extending diagonal portion 50d, and a forwardly extending socket end 50e.

A left hand axle 51 has a transversely outwardly extending portion 51a receiving the wheel 22 therearound, a vertical portion 51b extending downwardly from the portion 51a adjacent the wheel, a transversely inwardly extending horizontal portion 51c carrying the strut 28 and spring pad 30, a forwardly and inwardly extending diagonal portion 51d, and a forwardly extending eye end 51e adjacent the eye end 50e of the right hand axle 50.

Bracket plates 52 and 53 are secured on the under face of the transverse frame beam 12 adjacent the center thereof and have depending flanges 52a and 53a respectively carrying ball studs 19 seated in the eye ends 50e and 51e of the axles respectively. The axles are thus suspended in transverse alignment under the beam 12 at the center of the frame 10′.

The struts 28 both project forwardly from their respective axles under the beam 12 and are suspended on ball joints 19 in the manner described hereinabove.

The modification of Figure 6 thus includes right and left hand axle assemblies both of which are suspended from the same transverse axis and the wheels will swing about the same axis as they rise and fall.

In both illustrated forms of the invention the ball studs 19 provide fixed transversely spaced pivots for each axle and its strut but the ball sockets can rotate and tilt on the ball ends of the studs. Thus fixed tilting centers are provided but universal joint movements about these centers are accommodated. Because of this construction any torsion loads encountered by the suspensions are not transmitted to the frame and vice versa.

From the above descriptions it should be understood that the invention provides wheel suspensions which mount the wheels to swing parallel to the longitudinal axis of a frame or other part of the vehicle on universal joints such as ball joints which eliminate transfer of torsion twists between the suspensions and the frame or vehicle body, thereby permitting the use of lighter frame and body constructions and also accommodating misalignment of parts to increase tolerance limits in manufacturing. The wheel suspensions of this invention preferably include dropped axles and reinforcing struts connected to the dropped axle portions for minimizing bending moments ordinarily occurring in axle strut arrangements.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A wheel suspension adapted for trailer bodies and the like comprising a frame having a pair of transverse beams and a pair of longitudinal beams, a channel beam carried by said longitudinal beams spanning the space between the transverse beams, ball studs fixedly carried by said transverse beams in widely spaced relation, wheels positioned between the transverse beams outside of the longitudinal beams, axles carrying said wheels extending under the channel beam and thence respectively forwardly and rearwardly to the ball studs on the transverse beams which are located remote from the wheels carried by the axles, socket assemblies on the ends of the axles receiving said ball studs in universal joint relation, longitudinally extending struts carried by said axles adjacent said wheels and having socket assemblies on the ends thereof receiving ball studs adjacent the wheels, and coil springs interposed between the channel beam and the axles adjacent the wheels, said ball studs suspending each axle and its strut for swingably mounting the wheels independently of each other for longitudinal swinging movement in spaced parallel vertical planes.

2. A wheel suspension adapted for trailers and the like which comprises a frame having spaced parallel transverse beams and spaced parallel longitudinal beams, a pair of ball studs carried by each transverse beam in spaced transverse alignment, a wheel between each transverse beam outside of the longitudinal beams, wheel suspension arms each having a pair of arms pivoted on the pair of ball studs carried by a transverse beam, and spring means interposed between the frame and the suspension arms.

3. A wheel suspension comprising a frame having spaced parallel transverse beams and spaced parallel longitudinal beams together with a beam carried by the longitudinal beams and spanning the space therebetween, a pair of transversely spaced pivots on each transverse beam, wheel suspension arms swingably mounted on each pair of pivots, coil springs interposed between the suspension arms and the beam spanning the space between the longitudinal beams, and stabilizer means connected to said spanning beam and connecting said suspension arms to tie said arms together while allowing independent swinging movement of the arms about their pivots.

4. A wheel suspension comprising a transverse frame beam, a pair of spaced longitudinal frame beams, a channel beam carried by said longitudinal beams in spaced parallel relation from said transverse beam, two pairs of transversely spaced ball studs carried by the transverse beam, a pair of control arms each having two spaced arm portions with socket ends receiving said ball studs in universal joint relation, coil springs interposed between the beam spanning the space between the longitudinal beams and said control arms, and wheels carried by said control arms.

5. In combination with a frame, a wheel suspension comprising an axle having a wheel carrying portion and a dropped adjacent portion at a lower level than the wheel carrying portion, a strut connected to the dropped portion of the axle, and transversely aligned spaced suspension pivots carried by said frame for the strut and axle swingably mounting a wheel on the wheel carrying portion of the axle for movement in a vertical plane, said strut resisting twisting of the axle by braking forces of the wheel on the axle without being subjected to appreciable bending stresses.

6. In combination with a frame, an independent wheel suspension comprising a pair of axles each having wheel carrying portions and dropped center portions, struts substantially parallel with the plane of the wheels secured to the dropped portion of each axle adjacent the wheel carrying portion thereof, each axle and its strut having a ball socket end, transversely aligned spaced ball studs carried by said frame seated in the sockets of each axle and its strut to swingably suspend the axles for independent movements of the wheel carrying portions thereof in transversely spaced parallel vertical planes, and said struts being effective to resist twisting stresses on the wheel carrying portions of the axles without being subjected to excessive bending stresses.

7. In combination in a wheel suspension, a frame including a downwardly opening transverse channel beam, respective wheels beyond the opposite ends of said channel beam, independent axles supporting each of said wheels, means pivotally connecting said axles to said frame at points spaced longitudinally away from said beam and enabling the wheels to move independently in respective vertical planes, said axles extending under the respective adjacent end portions of said beam, respective spring pads secured on top of said axles beneath and in spaced relation to the respective adjacent end portions of said beam, coil springs resting upon said pads and extending up into and engaging against said beam to thereby support the frame in suspended relation to said axles, a torsion rod yoke connected to one side of said beam intermediate said springs and having generally horizontally extending arms adjacent to the respective springs, and means connecting said arms to said spring pads whereby to stabilize the vertical movements of said wheels.

8. In combination in a wheel suspension, a frame including a downwardly opening transverse channel beam, respective wheels beyond the opposite ends of said channel beam, independent axles supporting each of said wheels, means pivotally connecting said axles to said frame at points spaced longitudinally away from said beam and enabling the wheels to move independently in respective vertical planes, said axles extending under the respective adjacent end portions of said beam, suspension springs connected between and operating between said axles and said beam and extending up inside of said beam, one side of said beam having respective vertical slots located in said end portions of the beam, a torsion rod structure operatively connected to the outside of said beam side and having generally horizontal arms extending into the beam through said slots, and means operatively connecting said arms to said respective axles whereby to stabilize operation of the suspension.

JAMES H. BOOTH.

REFERENCES CITED

The following references are of record in the file of this patent:

UNITED STATES PATENTS

| Number | Name | Date |
|---|---|---|
| 1,915,134 | MacPherson | June 20, 1933 |
| 1,987,791 | Opolo | Jan. 15, 1935 |
| 2,052,778 | Leighton | Sept. 1, 1936 |
| 2,077,969 | Tibbetts | Apr. 20, 1937 |
| 2,084,320 | Coleman | June 22, 1937 |
| 2,098,522 | Simning | Nov. 9, 1937 |
| 2,105,132 | Soehner et al. | Jan. 11, 1938 |
| 2,111,696 | Sherman | Mar. 22, 1938 |
| 2,153,083 | Griswold | Apr. 4, 1939 |
| 2,153,271 | Paton | Apr. 4, 1939 |
| 2,157,773 | Probst | May 9, 1939 |
| 2,169,969 | Allison | Aug. 15, 1939 |
| 2,182,248 | Chayne | Dec. 5, 1939 |
| 2,200,798 | Megow | May 14, 1940 |
| 2,300,237 | Schroeter et al. | Oct. 27, 1942 |
| 2,309,811 | Utz | Feb. 2, 1943 |

FOREIGN PATENTS

| Number | Country | Date |
|---|---|---|
| 614,345 | France | Sept. 14, 1926 |